United States Patent Office
3,614,966
Patented Oct. 26, 1971

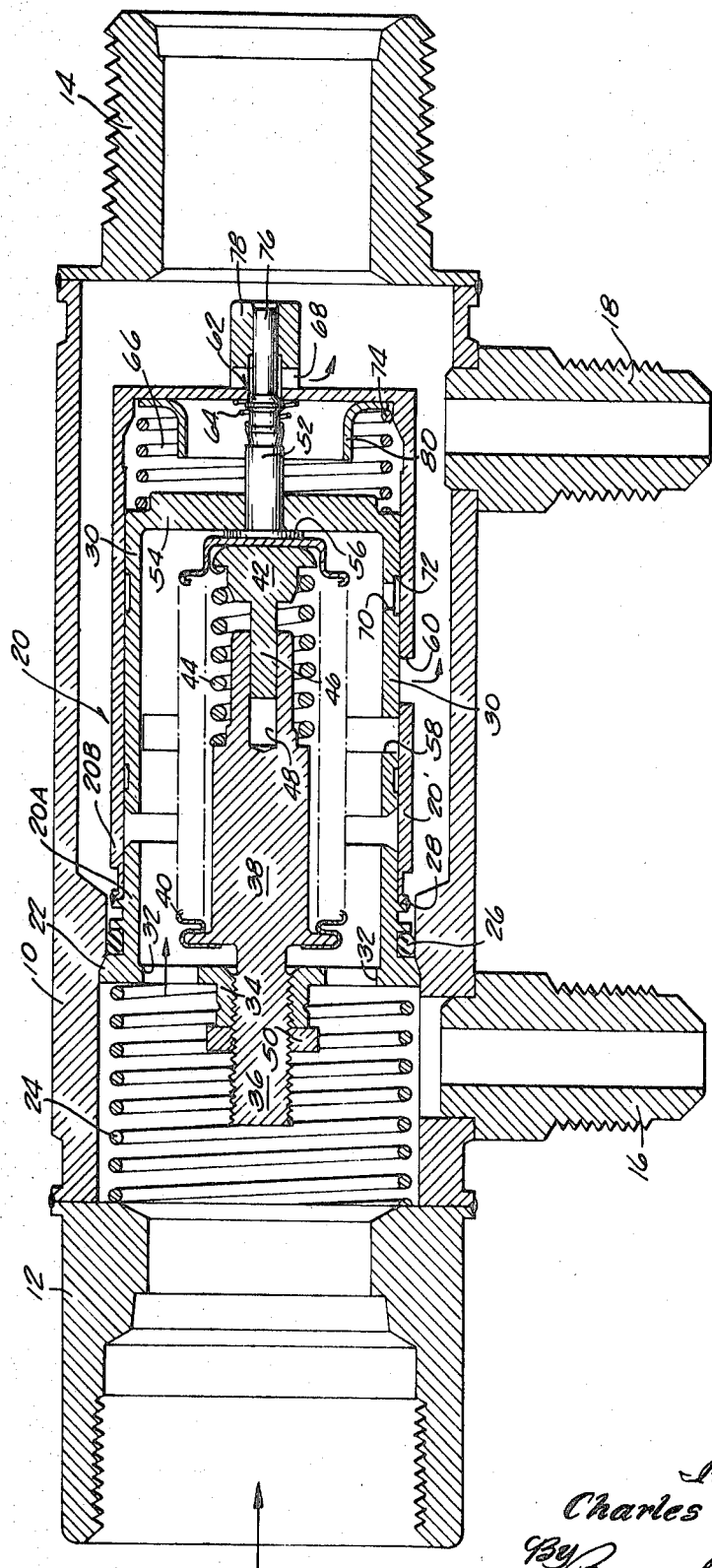

3,614,966
PILOT OPERATED EVAPORATOR PRESSURE REGULATOR VALVE

Charles D. Orth, Cedarburg, Wis., assignor to Controls Company of America, Melrose Park, Ill.
Filed Nov. 13, 1969, Ser. No. 876,279
Int. Cl. F16k 17/10
U.S. Cl. 137—489.3
6 Claims

ABSTRACT OF THE DISCLOSURE

The interior of the bellows is sealed at atmospheric pressure so the pressure on the outside of the bellows is resisted by the atmospheric pressure within the bellows as well as by the spring. When the pressure on the outside of the bellows (which is evaporator pressure in a refrigeration system) exceeds a predetermined amount, the bellows tends to collapse and the head of the bellows pulls away from the actuating pin and allows the spring acting on the pilot valve to open the pilot valve whereupon the pressure to the right of the head of the piston is reduced, allowing the piston to move to the right against the return spring force and, thus, open the outlet by registering the port in the piston wall with the slot in the stationary sleeve. When the pressure falls below the desired amount, the bellows expands and moves the head of the bellows against the actuating pin to close the pilot valve. Leakage between the piston and sleeve to the pilot valve chamber rapidly raises the pressure therein so that the return spring can move the piston to close the outlet. Even with the outlet closed, the slight clearance between the piston and sleeve allows some refrigerant flow to insure adequate flow to the compressor to keep the compressor lubricated.

BACKGROUND OF THE INVENTION

Pilot operated evaporator pressure regulator valves are not new per se but have been complex arrangements which are costly to manufacture and require a considerable amount of space. The present valve can be employed either as a separate unit or mounted within a compressor.

SUMMARY OF INVENTION

The present valve is small enough to mount within the compressor or can be mounted as a separate unit, in which case it needs the extra housing shown in the drawing. The advantage of the construction outlined in the abstract and illustrated in the drawing lies in the fact that the parts are readily fabricated and require a minimum of close fits while obtaining response to very limited pressure change. Uniform and accurate response or movement of the bellows is insured by guiding one end of the bellows relative to the other by means of a guide stem received in the blind hole in the adjustably fixed bellows support. The moving valve part is a sleeve or piston fitting within an outer fixed sleeve and having a head through which the actuating pin projects. The actuating pin is a floating or slidable member and, thus, this avoids concentricity problems while insuring proper actuation without distortion of the bellows. The pilot needle valve is guided to again avoid concentricity problems while insuring proper seating of the valve.

DESCRIPTION OF DRAWING

The single figure is a cross section through the pilot operated evaporator pressure valve enclosed in its own housing for use as a separate unit in an installation in the line. If the valve is to be used within a compressor, the outer housing shown is not necessary since this becomes a cavity in the compressor housing.

DESCRIPTION OF PREFERRED EMBODIMENT

In the illustrated form, the evaporator pressure regulator valve is enclosed in a housing having a central barrel 10 with inlets 12 and 14 applied respectively to the left and right ends of the barrel. The barrel is also provided with auxiliary fittings 16, 18 which may be used in some system installations. The evaporator pressure regulator includes a fixed housing sleeve 20 made up of two sleeves 20A and 20B and having a shoulder 22 adapted to seat on the cooperating internal shoulder in barrel 10 and be held thereagainst by means of spring 24 with the O-ring 26 sealing the passage between the fixed sleeve 20 and the inside of the barrel. The same sort of mounting can be used in placing the evaporator pressure regulator valve in a suitable cavity in a compressor housing and, of course, in those circumstances the barrel and fittings 12, 14, 16, 18 and spring 24 are omitted although a spring comparable to 24 would likely be used in holding the evaporator pressure regulator valve in place.

Sleeve 20B is welded to 20A at 28, this construction facilitating mounting of parts inside and to complete the assembly of what essentially amounts to a single sleeve 20 in which the piston 30 and the various other parts are mounted. One end of sleeve or housing 20 is provided with multiple inlet ports 32 and has a central internally threaded boss 34 through which the threaded stem 36 of the bellows support 38 projects. The bellows support has bellows 40 secured thereto with the other end of the bellows passing over seat 42, which serves as a seat for spring 44 inside the bellows. The seat has a guide stem 46 which is received in the blind hole 48 in the bellows support member. The space inside the bellows is at atmospheric pressure when it is sealed. Thus, the pressure on the outside of the bellows is resisted by the atmospheric pressure within the bellows as well as spring 44. The degree of compression of spring 44 is determined by turning the threaded stem 36 relative to the boss 34 and at the conclusion of the adjustment (which adjustment will determine the response pressure) the threaded boss 34 is crimped into the threads and the lock nut 50 is turned down tight. The bellows assembly acts against the head of actuating pin 52 which passes through the head 54 of the piston 30. The fit between piston 30 and the sleeve 20 must be carefully controlled since this determines the leak rate allowed through the valve when the valve is closed. Too much leakage would cause the refrigerant coil to freeze up while too little would not permit adequate oil circulation through the compressor and would cause the compressor suction pressure to run below atmospheric.

In the illustrated position, the ports 58 through the piston skirt are blanked off by the cylindrical housing and cannot register with the outlet ports 60 in the sleeve. Therefore, the valve is closed in this position and the only flow will be the controlled leakage determined by the fit between the two sleeves. When the pressures surrounding the bellows exceeds the adjusted value, it overcomes the atomspheric pressure inside the bellows and the force of spring 44 to move the bellows to the left, thus relieving the force on the actuating pin 52. The large head 56 on pin 52 avoids damage to the bellows by reason of localized force. When this occurs, the force is relieved from the needle valve 62 so that the spring 64, compressed between the head of the sleeve and the needle valve 62, can move the valve 62 to the left away from the cooperating seat and allow flow from the pilot chamber 66 past the needle valve to outlets 68. This drops the pressure in the pilot chamber since flow from the chamber now exceeds the rate of flow permitted by the small port 70 communicating with the peripheral groove 72 around the right end of the piston and, thence, between the two sleeves to the pilot chamber. With reduced pressure in a pilot chamber, the higher pressure acting on the left of the piston head 54 can overcome return spring 74 and move the piston to the right to bring piston ports 58 into registry with sleeve ports 60 and full flow through the regulator valve can occur. When the pressure surrounding the bellows drops below the desired value, the bellows starts to expand and this will act, through the actuating pin and the valve 62, to close valve 62 whereupon the pressure in the pilot chamber 66 will rise and allow spring 74 to move the piston to the left to close the main valve. When valve 62 is closed, the bellows-pin-valve assembly is "solid" and the spring 74 can return the piston to the left only until the piston head abuts the head 56 of pin 52, spring 24 being considerably stronger than spring 74.

The leakage between the piston and sleeve when the valve is closed is controlled by the fit of the piston in the sleeve. Guiding the moving end of the bellows on stem 46 prevents distortion of the bellows. The stop 80 stops piston movement in the full open position. The actuating pin is not connected to either the bellows or the valve so there is no problem of maintaining concentricity of the parts while insuring free movement of the parts. Valve stem 76 is guided in member 78 to insure proper valve motion and seating without concern for absolute concentricity with the pin 52. The clearance of pin 52 in piston head 54 and the fit of piston 30 in the sleeve are somewhat critical in that leakage should be below the flow rate through the pilot valve 62 since otherwise the pilot valve could not pilot operation of the main valve.

What is claimed is:

1. A pilot operated valve assembly comprising a cylindrical housing,
   a piston in the housing dividing it into inlet and pilot chambers,
   a pilot valve in the housing end wall,
   a sealed bellows fixed on the other end wall and projecting towards the pilot valve,
   an actuating pin extending between the bellows and the valve and passing through the piston head,
   a spring inside the bellows urging the free end of the bellows towards the valve with a force which, when combined with the internal pressure in the bellows, acts to seat the pilot valve when the pressure outside the bellows is below a predetermined value,
      there being a slight leakage between the two chambers at a rate less than the flow rate through the pilot valve when it is open but sufficient to equalize the pressures in the two chambers when the pilot valve is closed,
   an inlet in said other end wall of the housing,
   an outlet in the side wall of the housing,
   a second spring acting on the piston to move it to a position in which it closes off the outlet when the pilot valve is closed and the chamber pressures are equalized but being overcome by the pressure differential across the piston head when the pilot valve is opened by reason of pressure in the inlet chamber exceeding said predetermined value and causing the bellows to collapse,
   said piston moving to uncover the outlet when the second spring has been overcome.

2. A valve assembly according to claim 1 in which a spring seat is provided inside the moving end of the bellows and includes guide means cooperating with the fixed portion of the bellows to confine the bellows to in-line motion.

3. A valve assembly according to claim 1 in which the actuating pin is guided in the piston head and abuts but is not connected to the bellows and the pilot valve.

4. A valve assembly according to claim 1 in which there is controlled leakage between the piston and housing when the port is out of register with the outlet to provide a minimum flow.

5. A valve assembly according to claim 1 in which the housing is mounted in a cavity separating the inlet from the outlet and the pilot.

6. A valve assembly according to claim 1 in which the piston is limited in its movement in the opening direction by a limit stop and in the other direction by abutting the bellows.

References Cited
UNITED STATES PATENTS

| | | | |
|---|---|---|---|
| 2,896,662 | 7/1959 | Thomas | 251—325 X |
| 3,221,763 | 12/1965 | Widdowson | 137—491 X |

M. CARY NELSON, Primary Examiner

R. J. MILLER, Assistant Examiner